United States Patent Office 3,285,915
Patented Nov. 15, 1966

3,285,915
PREPARATION OF AMINOVINYL KETONES
James C. Martin, Kingsport, Tenn., assignor to Eastman Kodak Company, Rochester, N.Y., a corporation of New Jersey
No Drawing. Filed Jan. 2, 1964, Ser. No. 335,348
6 Claims. (Cl. 260—247.7)

This invention relates to a new chemical method and more particularly to method for preparing aminovinyl ketones by the reaction of a secondary amine with a 3-alkoxy-2,2-disubstituted cyclobutanone.

The method of the invention can be represented by the following equation:

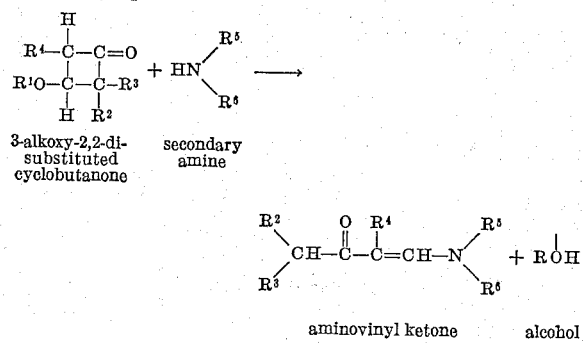

$R^1$, $R^2$ and $R^3$, taken singly, are the same or different alkyl radicals (including cycloalkyl) having up to about 8 carbon atoms, e.g., methyl, ethyl, n-butyl, i-butyl, cyclopentyl, cyclohexyl, n-hexyl, 2-ethylhexyl, n-octyl or the like, and preferably are lower alkyl. $R^2$ and $R^3$ can also be hydrogen. $R^2$ and $R^3$, taken collectively, are joined lower alkylene radicals that form a carbocyclic ring with the carbon to which they are attached, e.g., as found in tetramethyleneketene and pentamethyleneketene. Either one or both of $R^2$ and $R^3$ can also be phenyl or lower alkyl-substituted phenyl radicals such as tolyl, xylyl, etc. $R^4$ is hydrogen or lower alkyl. $R^5$ and $R^6$, taken singly, are lower alkyl radicals. In addition, $R^6$ but not $R^5$, can be phenyl or lower alkyl-substituted phenyl, e.g., tolyl, xylyl, etc. Taken collectively, $R^5$ and $R^6$ are bivalent radicals composed of atoms selected from the group consisting of carbon, hydrogen, nitrogen, oxygen and sulfur, which form a heterocyclic radical with the nitrogen atom such as morpholino, thiamorpholino, pyrrolidinyl, piperidino, N-alkyl piperazinyl, 3-azabicyclo[3.2.2]non-3-yl, and such radicals having lower alkyl substituents on at least one of their carbon atoms.

The method of the invention can also employ secondary diamines. These include diamines of the formula

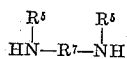

wherein $R^5$ is the same as above and $R^7$ is a bivalent hydrocarbyl group of up to about 8 carbon atoms, including alkylene and phenylene radicals. Examples of such amines include N,N'-dimethyl-p-phenylenediamine, N,N'-diethylethylenediamine, and the like. Another class of such diamines is the class of heterocyclic diamines of the formula

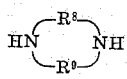

wherein $R^8$ and $R^9$ are bivalent hydrocarbyl radicals, e.g., lower alkylene radicals. Examples of such diamines include piperazine and lower alkyl-substituted piperazines.

When a diamine is employed the diamine and the alkoxycyclobutanone react in a 1:2 molar ratio yielding products of the formulae:

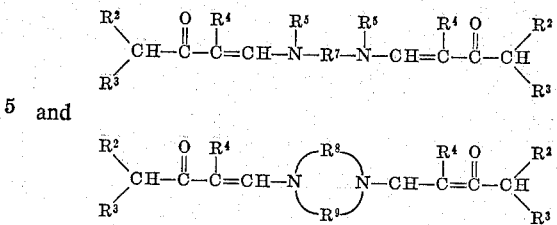

Examples of alkoxycyclobutanones of the above definition, which can be used in the method of the invention includes:

3-ethoxy-2,2-dimethylcyclobutanone,
3-butoxy-2,2-dimethylcyclobutanone,
3(2'-ethylhexoxy)-2,2-dimethylcyclobutanone,
3-ethoxy-2,2,4-trimethylcyclobutanone,
3-ethoxy-2,2-diphenylcyclobutanone,
2-butyl-3-ethoxy-2-ethylcyclobutanone,
2,2-diethyl-3-methoxycyclobutanone,
3-(isobutoxy)-2,2-diethylcyclobutanone,
3-cyclohexyloxy-2,2-dimethylcyclobutanone, etc.

A wide range of well-known secondary amines, having substituents $R^5$ and $R^6$ as defined above, can be used in the method of the invention. Examples include: aliphatic secondary amines such as dimethylamine, diethylamine, dibutylamines, aliphatic heterocyclic secondary amines such as pyrrolidine, piperidine, morpholine, N-methyl piperazine, and 3-azabicyclo[3.2.2]nonane; N-alkyl aromatic amines such as N-methylaniline, N-ethyl toluidine, diamines such as piperazine, N,N'-dimethyl-p-phenylenediamine, etc.

The alkoxycyclobutanones used as starting material can be prepared by the cycloaddition of unsaturated ethers with ketoketenes, e.g., by stirring equimolar proportions of the reactants (or using an excess of the ketene) in an inert solvent such as diethyl ether, hexane, or the like, at room temperature or by heating the solution under reflux at temperatures up to about 150° C.

Examples of unsaturated ethers and ketenes useful in preparing the alkoxycyclobutanones include: as ethers—2-ethylhexylvinyl ether, butylvinyl ether, i-butylvinyl ether, n-octylvinyl ether, cyclohexylvinyl ether, ethylvinyl ether, etc.; and as ketenes—ketene, methylketene, ethylketene, dimethylketene, diphenylketene, diethylketene, ethylmethylketene, butylethylketene, di-n-octylketene, tetramethyleneketene, pentamethyleneketene, etc.

The process can be carried out with or without a solvent. Suitable inert solvents are materials that do not react with either of the starting materials or the products and include such materials as aliphatic and aromatic hydrocarbons, ethers, chlorinated hydrocarbons, esters, nitriles, amides, etc., e.g., diethyl ether, toluene, xylene, p-cymene, carbon tetrachloride, dimethyl formamide, etc.

The method of the invention normally requires heating the reactants to temperatures substantially above room temperature, e.g., in the range of about 50–200° C. Best results are obtained with most reactants in the range of 100–150° C. The less reactive materials require higher reaction temperatures or longer heating periods. The products are recovered and purified by conventional procedures such as distillation or recrystallization.

The method of the invention is illustrated by the following examples:

*Example 1*

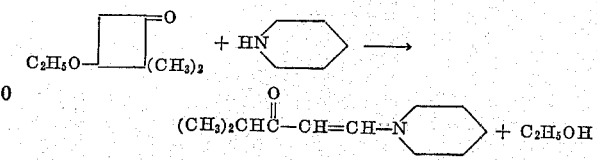

A solution of 142 g. (1.0 mole) of 3-ethoxy-2,2-dimethylcyclobutanone and 85 g. (1.0 mole) of piperidine in 200 ml. of toluene is refluxed for 6 hours. Distillation of this reaction solution through a 12-in. packed column gives, in addition to solvent and low boilers, 148 g. (82%) of 4-methyl-1-piperidino-1-penten-3-one, B.P. 112–114° (0.4 mm.) $n_D^{20}$ 1.5488.

*Analysis.*—Calcd. for $C_{11}M_{19}NO$: C, 72.9; H. 10.5; N, 7.7. Found: C, 72.8; H, 10.3; N, 7.8.

A solution of 91 g. (0.5 mole) of 2-butyl-3-ethoxy-2-ethylcyclobutanone and 35.5 g. (0.5 mole) of pyrrolidine in 200 ml. of xylene is refluxed for 3 hrs. Distillation of this solution gives 82.5 g. (74%) of 4-ethyl-1-pyrrolidino-1-octen-3-one, B.P. 151–154° (0.6 mm.).

Under the general conditions of Example 1 the following cyclobutanones and secondary amines react to give the products shown.

| Cyclobutanone | Amine | Product |
|---|---|---|
| (3-ethoxy-2,2-dimethylcyclobutanone) | $HN$-aniline ($CH_3$) | $(CH_3)_2CHC(O)-C(CH_3)=CH-N(CH_3)-C_6H_5$ |
| (2-ethyl-3-(2-butoxy)-cyclobutanone with $CH_3$) | $HN\langle\rangle NCH_3$ (N-methylpiperazine) | $(CH_3)_2CHC(O)-CH=CH-N\langle\rangle NCH_3$ |
| (3-methoxy-2,2-dimethylcyclobutanone) | hexamethyleneimine (HN ring with $CH_2$) | $(CH_3)_2CHC(O)-CH=CH-N$ (hexamethyleneimine) |
| (3-ethoxy-2,2-dimethylcyclobutanone) | $HN(C_4H_9)_2$ | $(CH_3)_2CHC(O)-CH=CH-N(C_4H_9)_2$ |
| (3-ethoxycyclobutanone) | $HN(CH_3)_2$ | $CH_3C(O)-CH=CH-N(CH_3)_2$ |
| (2,2-dibutyl-3-butoxycyclobutanone with $C_2H_5$) | $HN$ piperidine | $C_4H_9C(C_2H_5)-C(O)-CH=CH-N$ piperidine |
| 3-ethoxy-2,2-diphenylcyclobutanone | $HN$ piperidine | $(C_6H_5)_2CHC(O)-CH=CH-N$ piperidine |
| 3-ethoxy-2-butyl-2-ethylcyclobutanone | $HN\langle\rangle NH$ (piperazine) | $C_4H_9C(C_2H_5)-C(O)-CH=CH-N\langle\rangle N-CH=CH-C(O)-CH(C_2H_5)C_4H_9$ |

*Example 2*

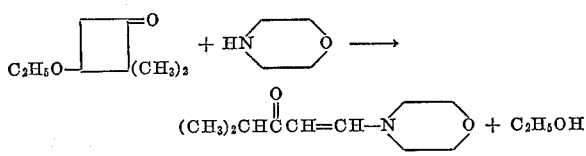

$(CH_3)_2CHC(O)CH=CH-N\langle\rangle O + C_2H_5OH$

A mixture of 142 g. (1.0 mole) of 3-ethoxy-2,2-dimethylcyclobutanone and 87 g. (1.0 mole) of morpholine is heated in an autoclave at 150° for 2 hours. This solution is distilled through a 10-in. packed column to give ethanol and 143 g. (78%) of 4-methyl-1-morpholino-1-penten-3-one, B.P. 133–135° (1 mm.), $n_D^{20}$ 1.5516.

*Example 3*

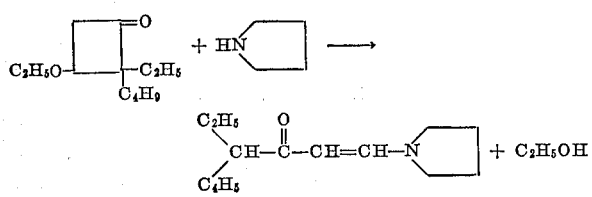

In the above preparations, when employing a diamine such as piperazine in the above reaction with 3-ethoxy-2,2-dimethylcyclobutanone to produce 1,4-piperazinyl-1,1'-bis(4-methyl-1-penten-3-one), the cyclobutanone is employed in an approximately 2:1 molar ratio with respect to the amine. When employing a volatile amine such as dimethylamine in the above reaction with 3-ethoxy-2,2-dimethylcyclobutanone to produce 1-dimethylamino-4-methyl-1-penten-3-one, the reaction is carried out by heating the reactants in an autoclave, e.g., at 150° C. for 8 hours.

Aminovinyl ketones as prepared by our process are known in the art. For example, they have been described by E. Benary, Ber. 63, 1573 (1930). They are useful principally as chemical intermediates, e.g., in the preparation of pyrazoles by reaction with hydrazine sulfate and oxazoles by reaction with hydroxyamine hydrochloride, as disclosed in my copending application Serial No. 126,876 filed July 26, 1961 which issued on July 21, 1964, as U.S. Patent 3,141,880.

Although the invention has been described in considerable detail with particular reference to certain preferred embodiments thereof, it will be understood that variations and modifications can be effected within the spirit and scope of the invention as described hereinabove, and as defined in the appended claims.

I claim:

1. The method which comprises heating a 3-alkoxy-cyclobutanone of the formula

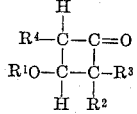

with a secondary amine selected from the group consisting of (a) 

(b) 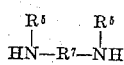

and (c) 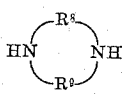

and recovering an aminovinyl ketone selected from the group consisting of (a) 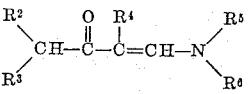

when amine (a) is used;

(b) 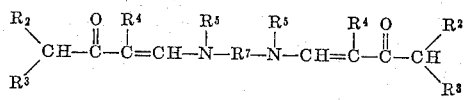

when amine (b) is used; and (c) 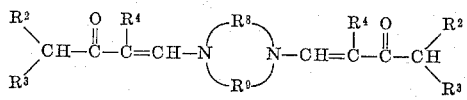

when amine (c) is used;

wherein $R^1$ is alkyl of 1–8 carbon atoms; $R^2$ and $R^3$, taken singly, are selected from the group consisting of hydrogen, alkyl of 1–8 carbon atoms, phenyl and lower alkyl phenyl and, taken collectively, form a lower akylene ring with the carbon atom to which they are attached; $R^4$ is selected from the group consisting of hydrogen and lower alkyl of 1–8 carbon atoms; $R^5$, taken singly, is lower alkyl of 1–8 carbon atoms; $R^6$, taken singly, is selected from the group consisting of alkyl of 1–8 carbon atoms, phenyl and lower alkyl phenyl, and wherein $R^5$ and $R^6$, together with the nitrogen, form a member selected from the group consisting of morpholino, thiamorpholino, pyrrolidino, piperidino, N-alkyl piperazino and 3-azabicyclo[3.2.2]non-3-yl radicals, $R^7$ is the bivalent hydrocarbon residue of a secondary amine of up to 8 carbon atoms and $R^8$ and $R^9$ are lower alkylene.

2. The method according to claim 1 in which the reaction is carried out at a temperature from about 100° to about 150° C.

3. The method according to claim 1 which comprises heating a compound of the formula

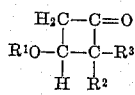

with a heterocyclic secondary amine selected from the group consisting of piperidine, pyrrolidine, morpholine and 3-azabicyclo[3.2.2]nonane and recovering a compound of the formula

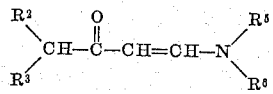

wherein $R^1$, $R^2$ and $R^3$ are lower alkyl and

is the residue of said amine.

4. The method of preparing 4-methyl-1-piperidino-1-penten-3-one which comprises heating 3-ethoxy-2,2-dimethyl-cyclobutanone with piperidine in approximately equimolar proportions.

5. The method of preparing 4-methyl-1-morpholino-1-penten-3-one which comprises heating 3-ethoxy-2,2-dimethylcyclobutanone with morpholino in approximately equimolar proportions.

6. The method of preparing 4-ethyl-1-pyrrolidino-1-octen-3-one which comprises heating 2-butyl-3-ethoxy-2-ethylcyclobutanone with pyrrolidine in approximately equimolar proportions.

No references cited.

ALEX MAZEL, Primary Examiner.

H. R. JILES, J. TOVAR, Assistant Examiners.